US011422962B2

(12) United States Patent
Green et al.

(10) Patent No.: US 11,422,962 B2
(45) Date of Patent: Aug. 23, 2022

(54) METHOD AND SYSTEM FOR HIGH INTEGRITY CAN BUS TRAFFIC SUPERVISION IN SAFETY CRITICAL APPLICATION

(71) Applicant: THALES CANADA INC., Toronto (CA)

(72) Inventors: Alon Green, Toronto (CA); Abe Kanner, Toronto (CA); Mihai Lungu, Toronto (CA)

(73) Assignee: THALES CANADA INC., Toronto (CA)

( * ) Notice: Subject to any disclaimer, the term of this patent is extended or adjusted under 35 U.S.C. 154(b) by 0 days.

(21) Appl. No.: 17/115,460

(22) Filed: Dec. 8, 2020

(65) Prior Publication Data

US 2021/0173801 A1    Jun. 10, 2021

Related U.S. Application Data

(60) Provisional application No. 62/945,675, filed on Dec. 9, 2019.

(51) Int. Cl.
*G06F 13/36* (2006.01)
*G06F 13/38* (2006.01)

(52) U.S. Cl.
CPC ............ *G06F 13/36* (2013.01); *G06F 13/38* (2013.01); *G06F 2213/40* (2013.01)

(58) Field of Classification Search
CPC ...... G06F 13/36; G06F 13/38; G06F 2213/40; H04L 12/4013
See application file for complete search history.

(56) References Cited

U.S. PATENT DOCUMENTS

| 8,850,099 | B2 | 9/2014 | Monbetsu |
| 8,959,392 | B2 | 2/2015 | Traskov et al. |
| 9,081,653 | B2 | 7/2015 | Ricci et al. |
| 9,606,948 | B2 * | 3/2017 | Monroe .............. G06F 13/4072 |
| 9,917,725 | B2 | 3/2018 | Diab et al. |

(Continued)

FOREIGN PATENT DOCUMENTS

JP    2010081152 A    4/2010

OTHER PUBLICATIONS

International Search Report and Written Opinion issued in corresponding International Application No. PCT/IB2020/061663, dated Mar. 10, 2021, pp. 1-9, Canadian Intellectual Property Office, Quebec, Canada.

(Continued)

*Primary Examiner* — Raymond N Phan
(74) *Attorney, Agent, or Firm* — Hauptman Ham, LLP

(57) ABSTRACT

A method of common controller area network (CAN) bus traffic supervision on a system having a common CAN bus, a first CAN chip and a second CAN chip, the first CAN chip and the second CAN chip are coupled together with the common CAN bus, the method includes comparing a first CAN frame received from the first CAN chip to a second CAN frame received from the second CAN chip within a CAN comparison period, and detecting a failure of at least the first CAN chip or the second CAN chip. Detecting the failure of at least the first CAN chip or the second CAN chip includes determining that the first CAN frame is not identical to the second CAN frame within the CAN comparison period.

20 Claims, 11 Drawing Sheets

(56) References Cited

U.S. PATENT DOCUMENTS

| | | | |
|---|---|---|---|
| 9,973,348 B2* | 5/2018 | Mounier | H04L 12/4013 |
| 10,397,019 B2 | 8/2019 | Hartung et al. | |
| 10,754,997 B1* | 8/2020 | Daily | G06F 21/85 |
| 2009/0044041 A1 | 2/2009 | Armbruster et al. | |
| 2013/0268798 A1 | 10/2013 | Schade et al. | |
| 2015/0200825 A1 | 7/2015 | Jang et al. | |
| 2018/0370540 A1 | 12/2018 | Yousuf et al. | |
| 2019/0068700 A1 | 2/2019 | Nandkishor et al. | |
| 2019/0222484 A1 | 7/2019 | Ricci et al. | |
| 2019/0258251 A1 | 8/2019 | Ditty et al. | |
| 2019/0296938 A1* | 9/2019 | van de Burgt | H04L 12/40136 |
| 2019/0361764 A1 | 11/2019 | Sari | |
| 2020/0267018 A1* | 8/2020 | Gupta | H03K 5/003 |
| 2020/0382340 A1* | 12/2020 | Muth | H04L 12/40039 |
| 2020/0403823 A1* | 12/2020 | van Dijk | H04L 67/12 |
| 2021/0184973 A1* | 6/2021 | Kwon | H04L 47/10 |

OTHER PUBLICATIONS

Baleani et al., "Fault-Tolerant Platforms for Automotive Safety-Critical Applications", Oct. 30, 2003; Proceedings of the 2003 international conference on Compilers, architecture and synthesis for embedded systems, pp. 170-177. http://www.academia.edu/download/43452869/Baleani_cases03.pdf.

Halba et al., "Robust Safety for Autonomous Vehicles through Reconfigurable Networking", arXiv preprint arXiv:1804.08407; Apr. 12, 2018, pp. 1-11. https://arxiv.org/pdf/1804.08407.pdf.

* cited by examiner

METHOD AND SYSTEM FOR HIGH INTEGRITY CAN BUS TRAFFIC SUPERVISION IN SAFETY CRITICAL APPLICATION

PRIORITY CLAIM

The present application claims the priority benefit of U.S. Provisional Patent Application No. 62/945,675, filed Dec. 9, 2019, the entirety of which is hereby incorporated by reference.

BACKGROUND

Controller area network (CAN) systems have one or more devices attached to a CAN bus by a CAN chip. The one or more devices communicate with each other by a CAN bus. The one or more devices receive CAN data payload from each other by the CAN bus. However, integrity of the CAN data payload received from the CAN bus is only checked by the CAN chip, and some CAN chips do not provide any safety integrity levels (SIL). Moreover, CAN chips may fail or be corrupted thereby reducing the integrity of the CAN data payload. Furthermore, the health of CAN chips are not even checked thereby further corrupting the CAN data payload. Thus, the reliability of the CAN data payload may be corrupted, and does not satisfy high levels of safety integrity.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

Figure 1:
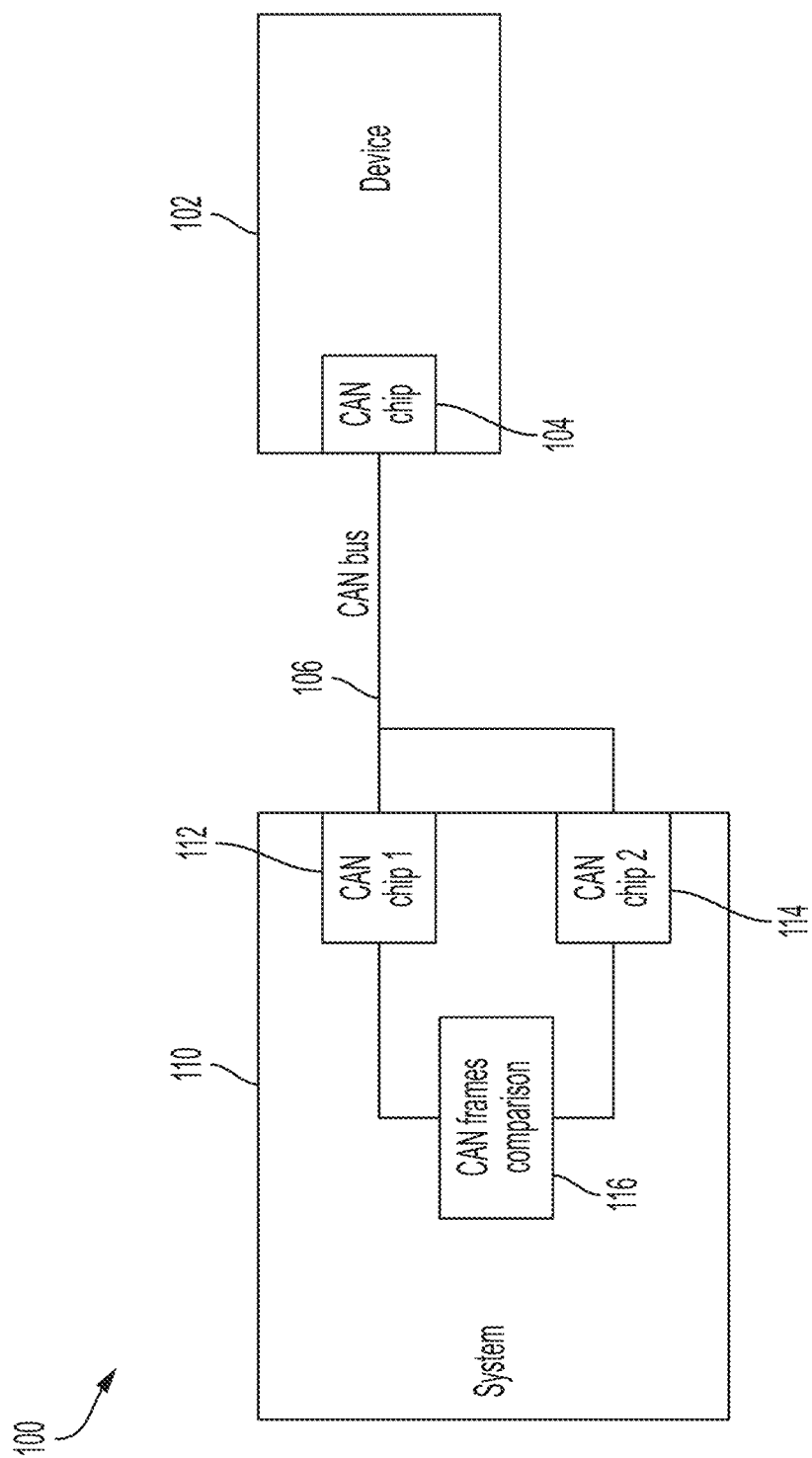
FIG. 1 is a diagram of a system, in accordance with one or more embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a system 100, in accordance with one or more embodiments.

System 100 includes a device 102 coupled to a computer system 110 by a controller area network (CAN) bus 106. In some embodiments, system 100 is associated with a vehicle, ships, planes, electric vehicle batteries, machinery and the like. In some embodiments, one or more portions of system 100 is located on the vehicle (not shown), ships, planes, electric vehicle batteries, machinery and the like. In some embodiments, a vehicle includes trains, cars, trucks, buses, tractors, or the like.

Device 102 includes a CAN chip 104. CAN chip 104 is coupled to CAN bus 106. In some embodiments, a CAN chip corresponds to a CAN node. In some embodiments, a CAN node includes at least a central processing unit (CPU), a CAN controller or a transceiver.

In some embodiments, device 102 corresponds to one or more sensors, actuators, or other control devices. In some embodiments, device 102 corresponds to one or more electronic control units (ECUs). In some embodiments, device 102 includes other elements (not shown) including one or more processors coupled to memory and further coupled to the one or more sensors, actuators, or other control devices. In some embodiments, device 102 is standardized and is not modified to function within system 100.

Computer system 110 is configured to communicate and control device 102 by CAN bus 106. In some embodiments, computer system 110 is a computer-based system configured to execute one or more functions including safety functions that include high levels of safety integrity. For example, in some embodiments, computer system 110 satisfies safety integrity level 4 (SIL 4). Other safety integrity levels are within the scope of the present disclosure.

Computer system 110 includes a CAN chip 112 and a CAN chip 114. CAN chip 112 and CAN chip 114 are coupled together by a same or common CAN bus (e.g., CAN bus 106). At least CAN chip 112 or CAN chip 114 is coupled to CAN chip 104 by CAN bus 106. At least CAN chip 112 or CAN chip 114 are configured to send/receive CAN frames to/from CAN chip 104 by CAN bus 106. In some embodiments, CAN chips 112 and 114 are configured to send/receive CAN frames to each other by CAN bus 106. In some embodiments, computer system 110 is also referred to as a CAN system.

CAN chip 112 is different from CAN chip 114. In some embodiments, a different CAN chip includes CAN chips that are manufactured by different entities. In some embodiments, CAN chip 112 is the same as CAN chip 114. In some embodiments, a same CAN chip includes CAN chips that are manufactured by the same entity.

In some embodiments, CAN chips 112 and 114 are configured to perform a cyclic redundancy check (CRC) of received CAN frames from CAN chip 102, strip off the CRC and forward the remaining portion of the CAN frame (hereinafter referred to as "remaining CAN frame") to a CAN frames comparison portion 116. The remaining CAN frame includes a CAN frame payload (hereinafter referred to as "payload"), CAN frame ID (hereinafter referred to as "ID") and other data.

In some embodiments, CAN chip 104 is configured to perform a CRC of received CAN frames from at least CAN chip 112 or 114, strip off the CRC and forward the remaining CAN frame to other elements (not shown) within device 102.

Computer system 110 further includes a CAN frames comparison portion 116. CAN frames comparison portion 116 is coupled to CAN chip 112 and CAN chip 114. In some embodiments, CAN frames comparison portion 116 is a controller. In some embodiments, CAN frames comparison portion 116 is a processor (shown in FIGS. 4-7B). CAN frames comparison portion 116 is configured to detect a failure of at least CAN chip 112 or CAN chip 114. In some embodiments, a failure is a deviation from a specified performance of system 100 or the consequence of a fault or error in system 100. In some embodiments, a failure includes random failures and systemic failures. In some embodiments, random failures include a failure that occurs randomly in time. In some embodiments, systemic failures include a failure that occurs repeatedly under some particular combination of inputs, or under some particular environmental condition.

In some embodiments, failure of at least CAN chip 112 or CAN chip 114 results in the corresponding failed CAN chip forwarding corrupted data (e.g., frames) to CAN frames comparison portion 116 or other portions (e.g., system 410 in FIGS. 4-6) of computer system 110.

In some embodiments, CAN frames comparison portion 116 is configured to detect a failure of at least CAN chip 112 or CAN chip 114 by comparing the remaining portion of CAN frames (hereinafter referred to as "remaining CAN frames") received from each of CAN chip 112 and CAN chip 114 during a CAN comparison period. In some embodiments, a CAN comparison period is a maximum time between a remaining CAN frame received from CAN chip 112 and a remaining CAN frame received from CAN chip 114. In some embodiments, if a failure is detected, then a redundant system such as system 200 (FIG. 2) or system 300 (FIG. 3) are used. In some embodiments, the comparison period ranges from about 10 milliseconds (ms) to about 100 ms. In some embodiments, the comparison period is a function of the number of CAN frames that are to be compared. In some embodiments, if the comparison period is less than 10 ms, then the comparison period may not provide sufficient time for CAN frames to be received, and processed by system 100 in order for a comparison. In some embodiments, if the comparison period is greater than 10 ms, then the comparison period may cause unwanted delay of CAN frames, and unwanted delay in the payload of the CAN frames useable by system 100.

If the remaining CAN frames received from both independent chips are identical, then both CAN chip 112 and CAN chip 114 have not failed, and data (e.g., remaining CAN frames) sent from device 102 to CAN chips 112 and 114 is not corrupted by the failed CAN chips, and is therefore trusted or reliable. For example, in some embodiments, if the payload received from both independent chips is identical, then both CAN chip 112 and CAN chip 114 have not failed, and payload sent from device 102 to CAN chips 112 and 114 is not corrupted by the failed CAN chips, and is therefore trusted or reliable.

In some embodiments, if the CAN frame payload from CAN chip 112 is missing or not available within the CAN comparison period, then CAN frames comparison portion 116 determines that a failure of at least CAN chip 112 occurred.

In some embodiments, if the CAN frame payload from CAN chip 114 is missing or not available within the CAN comparison period, then CAN frames comparison portion 116 determines that a failure of at least CAN chip 114 occurred.

In some embodiments, if the remaining CAN frame from CAN chip 112 or the remaining CAN frame from CAN chip 114 is missing or not available within a CAN timeout, then CAN frames comparison portion 116 determines that a failure occurred with the CAN chip (112 or 114) with the missing or unavailable CAN frame. In some embodiments, a CAN timeout is the maximum time without any remaining CAN frame on CAN bus 106.

In some embodiments, if the content of the remaining CAN frames from corresponding CAN chips 112 and 114 are not identical within the CAN comparison period, then CAN frames comparison portion 116 determines that a failure of at least CAN chip 112 or 114 occurred.

By using at least two CAN chips (112 and 114) and CAN frames comparison portion 116, computing system 110 is able to detect failures in at least CAN chip 112 or CAN chip 114, thereby preventing or reducing the number of corrupted frames in the transmission layer (e.g., CAN bus) that passes through computing system 110. By reducing the number of corrupted frames that passes through computing system 110 results in more reliable data thereby increasing the safety level of system 100 and reducing system errors.

Furthermore, system 100 improves reliability of data from device 102 without modifying the firmware CAN chip 104, 112 or 114.

Moreover, system 100 improves reliability of data from device 102 without adding CRC or other types of safety code signature protection to the data generated by device 102 thereby reducing CAN bus network traffic.

Other quantities, configurations or order of elements within system 100 are within the scope of the present disclosure. For example, in some embodiments, system 100 includes more than two CAN chips.

Figure 2:
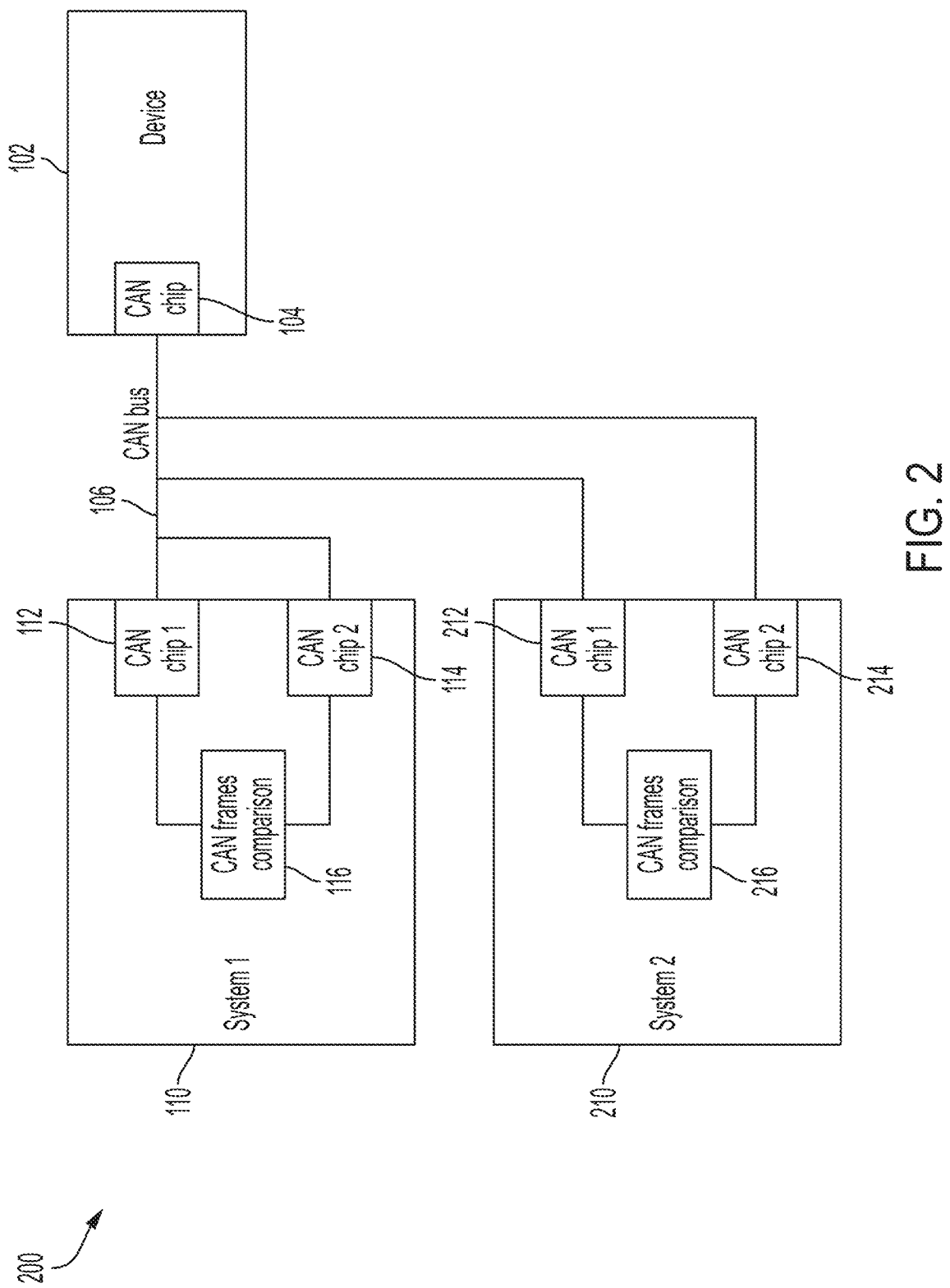
FIG. 2 is a diagram of a system, in accordance with one or more embodiments.

FIG. 2 is a diagram of a system 200, in accordance with one or more embodiments.

System 200 is a variation of system 100 of FIG. 1, and similar detailed description is therefore omitted. In comparison with system 100, system 200 further includes a computer system 210. In some embodiments, computer system 210 is a redundant system.

Components that are the same or similar to those in one or more of FIGS. 1-10 (shown below) are given the same reference numbers, and detailed description thereof is thus omitted. In some embodiments, FIGS. 1-10 include additional elements not shown in FIGS. 1-10.

Computer system 210 is similar to computer system 110, and similar detailed description is omitted for brevity. In some embodiments, computer system 210 is a redundant version of system 110. For example, in some embodiments, if a failure of CAN chip 112 or CAN chip 114 is detected by system 110, then switchover is performed to a redundant system, such as computer system 210. In some embodiments, prior to switchover to the redundant system, computer system 210 is not operational, and after switchover, computer system 210 is operational. In some embodiments, prior to switchover to the redundant system, computer system 210 is operational, and after switchover, computer system 210 remains operational, but computer system 110 is not operational.

Computer system 210 includes a CAN chip 212, a CAN chip 214 and a CAN frames comparison portion 216.

CAN chip 212 is similar to CAN chip 112, CAN chip 214 is similar to CAN chip 114, CAN frames comparison portion 216 is similar to CAN frames comparison portion 116, and similar detailed description is omitted for brevity.

CAN chip 212 and CAN chip 214 are coupled together by CAN bus 106. At least CAN chip 212 or CAN chip 214 is coupled to CAN chip 104 by CAN bus 106. CAN chip 212 is different from CAN chip 214. In some embodiments, CAN chip 212 is the same as CAN chip 214. In some embodiments, CAN chip 212 is different from CAN chip 112. In some embodiments, CAN chip 212 is the same as CAN chip 112. In some embodiments, CAN chip 214 is different from CAN chip 114. In some embodiments, CAN chip 212 is the same as CAN chip 112.

By including computer system 210 in system 200, system 200 operates to achieve the benefits discussed above with respect to system 100.

Other quantities, configurations or order of elements within system 200 are within the scope of the present disclosure. For example, in some embodiments, system 200 includes a number of CAN chips different than five.

Figure 3:
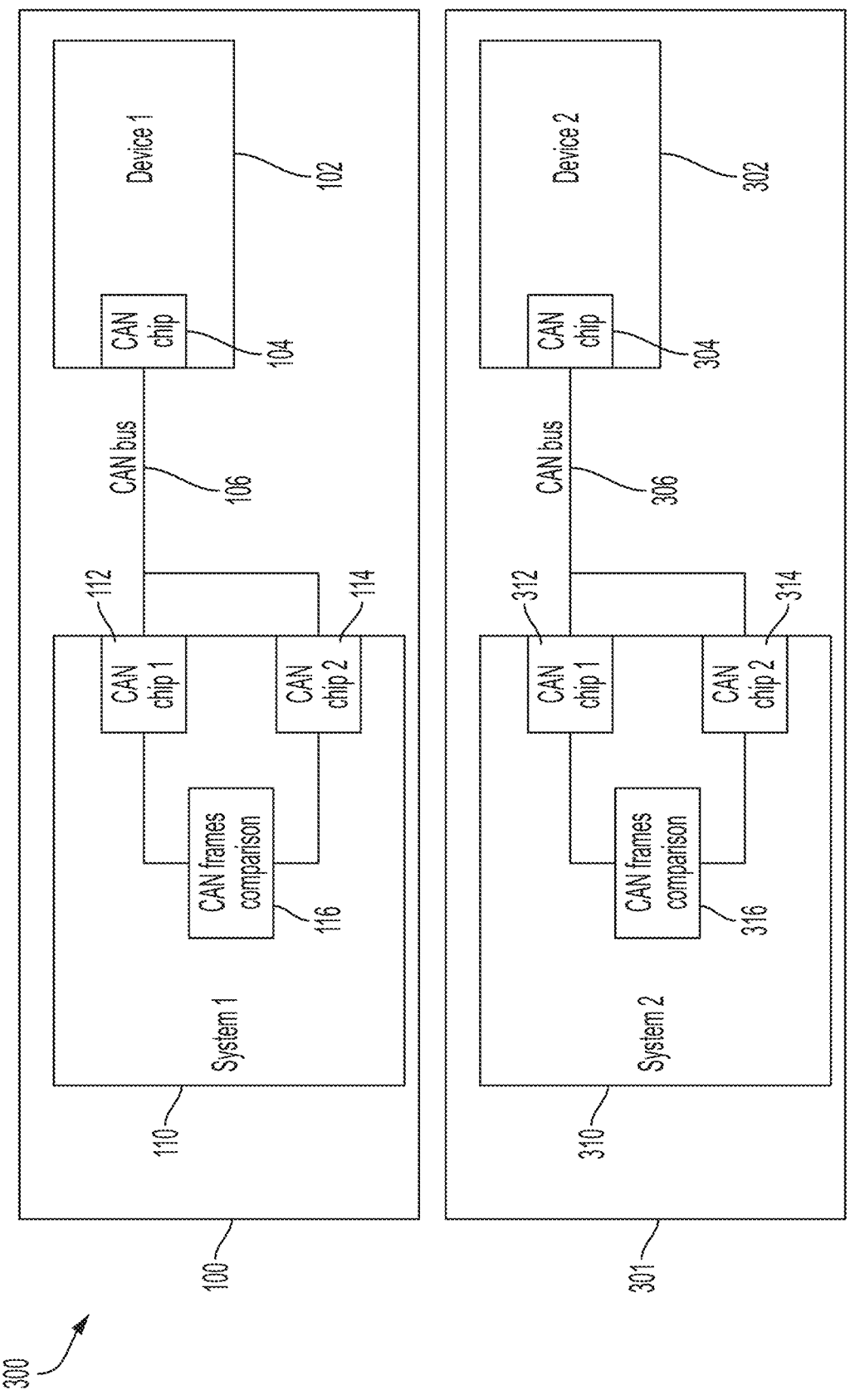
FIG. 3 is a diagram of a system, in accordance with one or more embodiments.

FIG. 3 is a diagram of a system 300, in accordance with one or more embodiments.

System 300 is a variation of system 100 of FIG. 1, and similar detailed description is therefore omitted. In comparison with system 100, system 300 further includes a system 301. In some embodiments, system 301 is a redundant system.

System 301 is similar to system 100, and similar detailed description is omitted for brevity. In some embodiments, system 301 is a redundant version of system 100. For example, in some embodiments, if a failure of CAN chip 112 or CAN chip 114 is detected by system 110, then switchover is performed to a redundant system, such as system 301. In some embodiments, prior to switchover to the redundant system, system 301 is not operational, and after switchover, system 301 is operational. In some embodiments, prior to switchover to the redundant system, system 301 is operational, and after switchover, system 301 remains operational, but system 100 is not operational.

System 301 includes a device 302 coupled to a computer system 310 by a CAN bus 306. Device 302 includes a CAN chip 304. CAN chip 304 is coupled to CAN bus 306.

Device 302 is similar to device 102, CAN chip 304 is similar to CAN chip 104, CAN bus 306 is similar to CAN bus 106, computer system 310 is similar to computer system 110, and similar detailed description is omitted for brevity.

Computer system 310 includes a CAN chip 312, a CAN chip 314 and a CAN frames comparison portion 316. CAN chip 312 is similar to CAN chip 112, CAN chip 314 is similar to CAN chip 114, CAN frames comparison portion 316 is similar to CAN frames comparison portion 116, and similar detailed description is omitted for brevity.

CAN chip 312 and CAN chip 314 are coupled together by CAN bus 306. At least CAN chip 312 or CAN chip 314 is coupled to CAN chip 304 by CAN bus 306. CAN chip 312 is different from CAN chip 314. In some embodiments, CAN chip 312 is the same as CAN chip 314.

In some embodiments, CAN chip 312 is different from CAN chip 112. In some embodiments, CAN chip 312 is the same as CAN chip 112. In some embodiments, CAN chip 314 is different from CAN chip 114. In some embodiments, CAN chip 312 is the same as CAN chip 112.

By including system 301 in system 300, system 300 operates to achieve the benefits discussed above with respect to system 100.

Other quantities, configurations or order of elements within system 300 are within the scope of the present disclosure. For example, in some embodiments, system 300 includes a number of CAN chips different than six.

Figure 4:
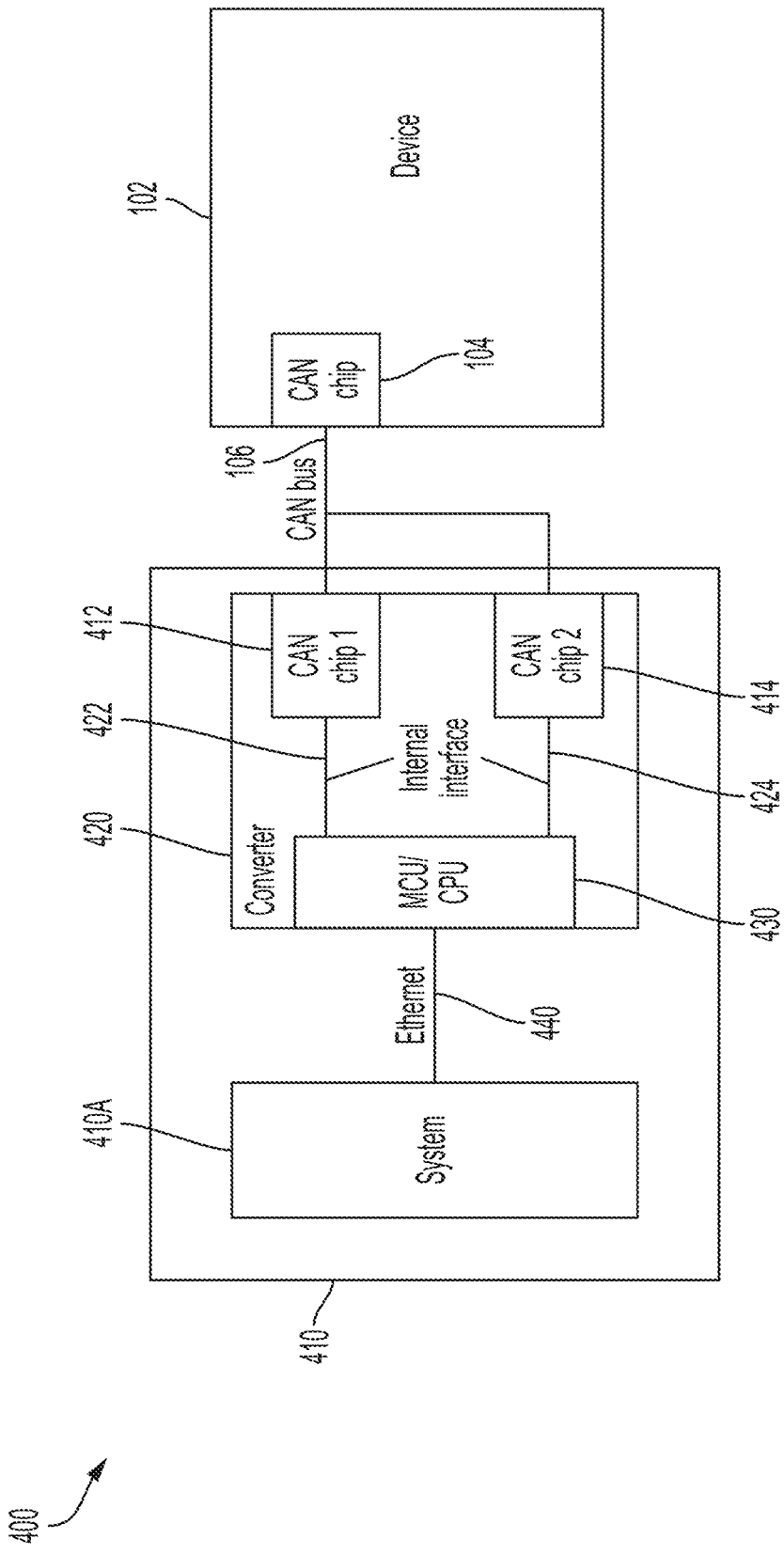
FIG. 4 is a diagram of a system, in accordance with one or more embodiments.

FIG. 4 is a diagram of a system 400, in accordance with one or more embodiments.

System 400 is an embodiment of system 100 of FIG. 1, and similar detailed description is therefore omitted.

System 400 includes device 102, CAN chip 104, CAN bus 106 and a computer system 410.

Computer system 410 is an embodiment of computer system 110 of FIG. 1, and similar detailed description is therefore omitted.

Computer system 410 includes a converter circuit 420 coupled to a system portion 410A by an Ethernet link 440.

Converter circuit 420 is coupled to CAN chip 104 of device 102 by CAN bus 106. Converter circuit 420 is configured to send/receive CAN frames to/from CAN chip 104 by CAN bus 106.

Converter circuit 420 is coupled to an Ethernet interface (shown in FIG. 10 as network interface 1012) of system portion 410A by Ethernet link 440. In some embodiments, Ethernet link 440 includes an Ethernet network. Ethernet link 440 is configured to carry Ethernet packets between converter circuit 420 and system portion 410A. Converter circuit 420 is configured to convert Ethernet packets into CAN frames, and send the CAN frames to CAN chip 104 by CAN bus 106. Converter circuit 420 is configured to convert CAN frames into Ethernet packets, and send the Ethernet packets to system portion 410A by Ethernet link 440.

Other types of network links for system 400, 500, 600, 700A and 700B are within the scope of the present disclosure. For example, in some embodiments, Ethernet link 440 is replaced by a different type of network link, and the Ethernet interface of system portion 410A is replaced with a different type of network interface.

Figure 10:
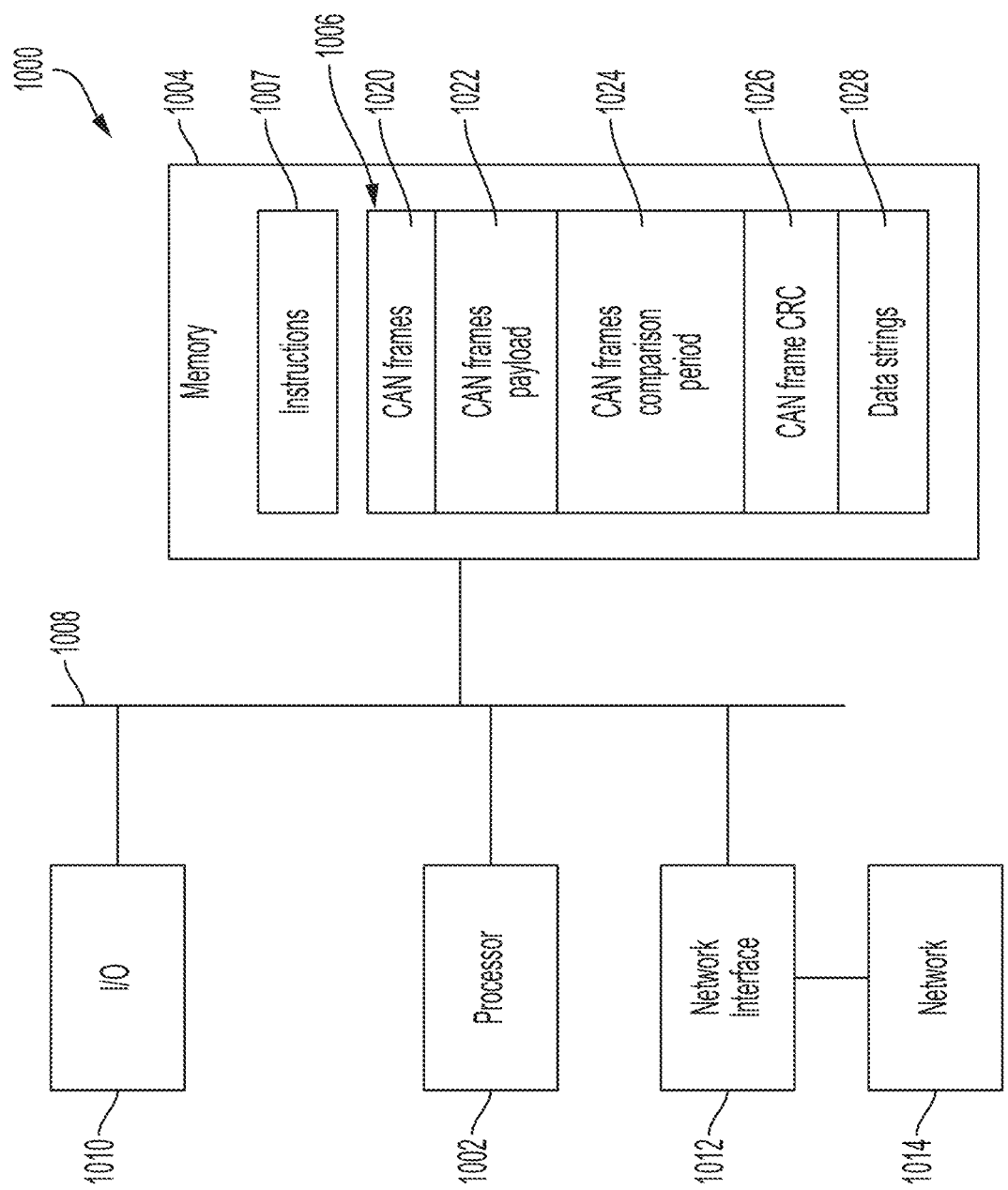
FIG. 10 is a block diagram of a system, in accordance with one or more embodiments.

System portion 410A includes at least a processor 1002 (FIG. 10), a memory 1004 (FIG. 10), a bus 1008 (FIG. 10). In some embodiments, system 1000 of FIG. 10 is an embodiment of system portion 410A.

Converter circuit 420 includes a CAN chip 412, a CAN chip 414 and a processor 430.

CAN chip 412 is similar to CAN chip 112, CAN chip 414 is similar to CAN chip 114, and similar detailed description is omitted for brevity.

CAN chip 412 is coupled to processor 430 by an interface 422. CAN chip 414 is coupled to processor 430 by an interface 424. At least interface 422 or 424 is an interface internal of converter circuit 420. In some embodiments, at least interface 422 or 424 corresponds to memory. In some embodiments, at least interface 422 or 424 corresponds to inter-integrated circuit ($I^2C$). In some embodiments, at least interface 422 or 424 corresponds to serial peripheral interface (SPI).

Processor 430 is coupled to the Ethernet interface of system portion 410A by Ethernet link 440. At least processor 430 or system portion 410A is an embodiment of CAN frames comparison portion 116 of FIG. 1, and similar detailed description is therefore omitted. In some embodiments, processor 430 is a CPU. In some embodiments, processor 430 is a controller. In some embodiments, processor 430 is a micro-controller unit (MCU).

In some embodiments, system portion 410A is configured to detect a failure of at least CAN chip 412 or CAN chip 414. For example, in some embodiments, CAN chips 412 and 414 are configured to receive the same CAN frames from device 102, and CAN chips 412 and 414 are configured to strip off the CRC and forward the remaining CAN frame to processor 430. In these embodiments, processor 430 is configured to forward or pass the remaining CAN frame to system portion 410A. In these embodiments, system portion 410A is configured to detect a failure of at least CAN chip 412 or CAN chip 414 by executing a frame comparison similar to the frame comparison performed by CAN frames comparison portion 116 in FIG. 1, and similar detailed description is omitted for brevity.

In some embodiments, processor 430 is configured to detect a failure of at least CAN chip 412 or CAN chip 414, and send failure notifications to system portion 410A. For example, in some embodiments, CAN chips 412 and 414 are configured to receive the same CAN frames from device 102, and CAN chips 412 and 414 are configured to strip off the CRC and forward the remaining CAN frame to processor 430. In these embodiments, processor 430 is configured to detect a failure of at least CAN chip 412 or CAN chip 414 by executing a frame comparison similar to the frame comparison performed by CAN frames comparison portion 116 in FIG. 1, and similar detailed description is omitted for brevity.

In these embodiments, by having processor 430 configured to perform frame comparison to detect a failure of at least CAN chip 412 or CAN chip 414, processor 430 is configured to send less traffic to system portion 410A which thereby reduces traffic sent over Ethernet link 440. In some embodiments, the traffic is reduced by 50%. In these embodiments, processor 430 is further configured to execute health checks of CAN chip 414 and 414, such as memory tests, voltage monitoring and current monitoring, to ensure the integrity of CAN frames comparison.

By including system 410 in system 400, system 400 operates to achieve the benefits discussed above with respect to system 100.

Other quantities, configurations or order of elements within system 400 are within the scope of the present disclosure. For example, in some embodiments, system 400 includes a number of CAN chips different than three.

Figure 5:
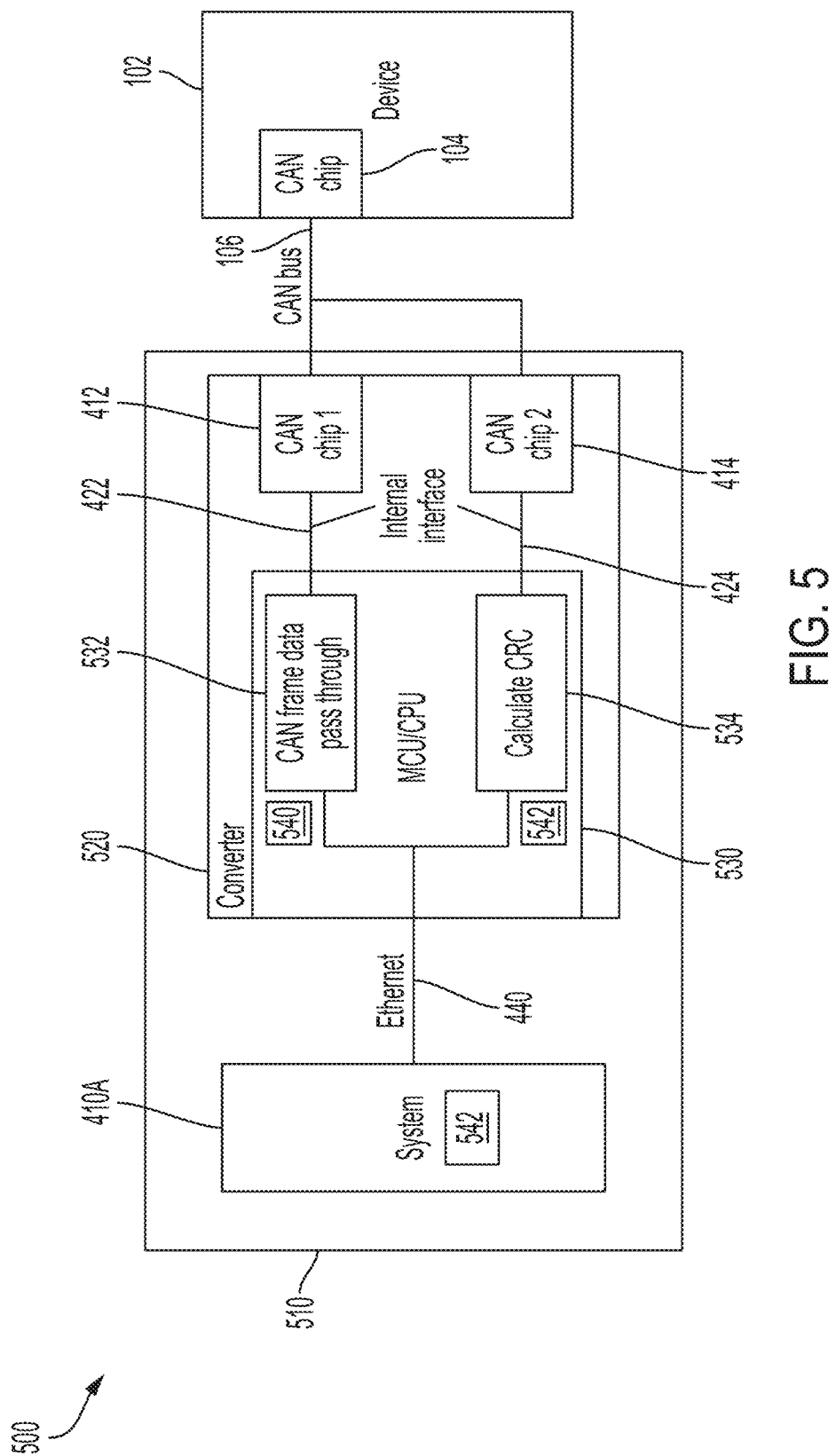
FIG. 5 is a diagram of a system, in accordance with one or more embodiments.

FIG. 5 is a diagram of a system 500, in accordance with one or more embodiments.

System 500 is an embodiment of system 100 of FIG. 1, and similar detailed description is therefore omitted.

System 500 includes device 102, CAN chip 104, CAN bus 106 and a computer system 510. Computer system 510 is an embodiment of computer system 110 of FIG. 1, and similar detailed description is therefore omitted.

Computer system 510 is a variation of computer system 410 of FIG. 4, and similar detailed description is therefore omitted. In comparison with computer system 410 of FIG. 4, computer system 510 includes a converter circuit 520 rather than converter circuit 420, and similar detailed description is therefore omitted. Stated differently, converter circuit 520 of computer system 510 replaces converter circuit 420 of computer system 410 in FIG. 4, and similar detailed description is therefore omitted.

Computer system 510 includes a converter circuit 520 coupled to system portion 410A by Ethernet link 440. Converter circuit 520 is a variation of converter circuit 420 of FIG. 4, and similar detailed description is therefore omitted.

Converter circuit 520 includes CAN chip 412, CAN chip 414 and a processor 530. Processor 530 is similar to processor 430, and similar detailed description is omitted for brevity.

Processor 530 includes a CAN frame data pass through portion 532 and a Calculate CRC portion 534. In some embodiments, system portion 410A is configured to detect a failure of CAN chip 412 and CAN chip 414 by having processor 530 configured with CAN frame data pass through portion 532 and Calculate CRC portion 534.

In some embodiments, CAN frame data pass through portion 532 and Calculate CRC portion 534 are portions or regions within processor 530. In some embodiments, processor 530 includes at least two processors, and CAN frame data pass through portion 532 is part of a first processor of the at least two processors in processor 530 and Calculate CRC portion 534 is part of a second processor of the at least two processors in processor 530.

In some embodiments, CAN frame data pass through portion 532 is configured to execute instructions to pass CAN frames to system portion 410A. In some embodiments, Calculate CRC portion 534 is configured to execute instructions to calculate a CRC on remaining CAN frames and send them to system portion 410A.

In some embodiments, system portion 410A is configured to detect a failure of CAN chip 412 and CAN chip 414. For example, in some embodiments, CAN chips 412 and 414 are configured to receive the same CAN frames from device 102, and CAN chips 412 and 414 are configured to strip off the CRC and forward the remaining CAN frame to each of CAN frame data pass through portion 532 and Calculate CRC portion 534.

In these embodiments, CAN frame data pass through portion 532 is configured to receive the remaining CAN frame from CAN chip 412, and pass the at least a first CAN frame data payload 540 of the remaining CAN frame received from CAN chip 412 to system portion 410A by Ethernet link 440.

In these embodiments, Calculate CRC portion 534 is configured to receive the remaining CAN frame from CAN chip 414, determine a first CRC 542 or other safety code signature on a second CAN frame data payload of the remaining CAN frame received from CAN chip 414, and is configured to pass the first CRC 542 to system portion 410A by Ethernet link 440.

In these embodiments, system portion 410A is configured to receive the first CAN frame data payload 540 and the first CRC 542, is configured to determine a second CRC 544 based on the first CAN frame data payload 542, and is configured to compare the first CRC 542 and the second CRC 544 to each other. In these embodiments, system portion 410A is configured to determine that a failure of at least CAN chip 412 or CAN chip 414 occurred in response to determining that the first CRC 542 is not identical to the second CRC 544, and therefore the CAN frame payload data 542 is not trusted or not reliable. In these embodiments, system portion 410A is configured to determine that the failure of at least CAN chip 412 or CAN chip 414 did not occur in response to determining that the first CRC 542 is identical to the second CRC 544, and therefore the CAN frame payload data 542 is trusted or reliable.

By including system 510 in system 500, system 500 operates to achieve the benefits discussed above with respect to system 100.

Other quantities, configurations or order of elements within system 500 are within the scope of the present disclosure. For example, in some embodiments, system 500 includes a number of CAN chips different than three.

Figure 6:
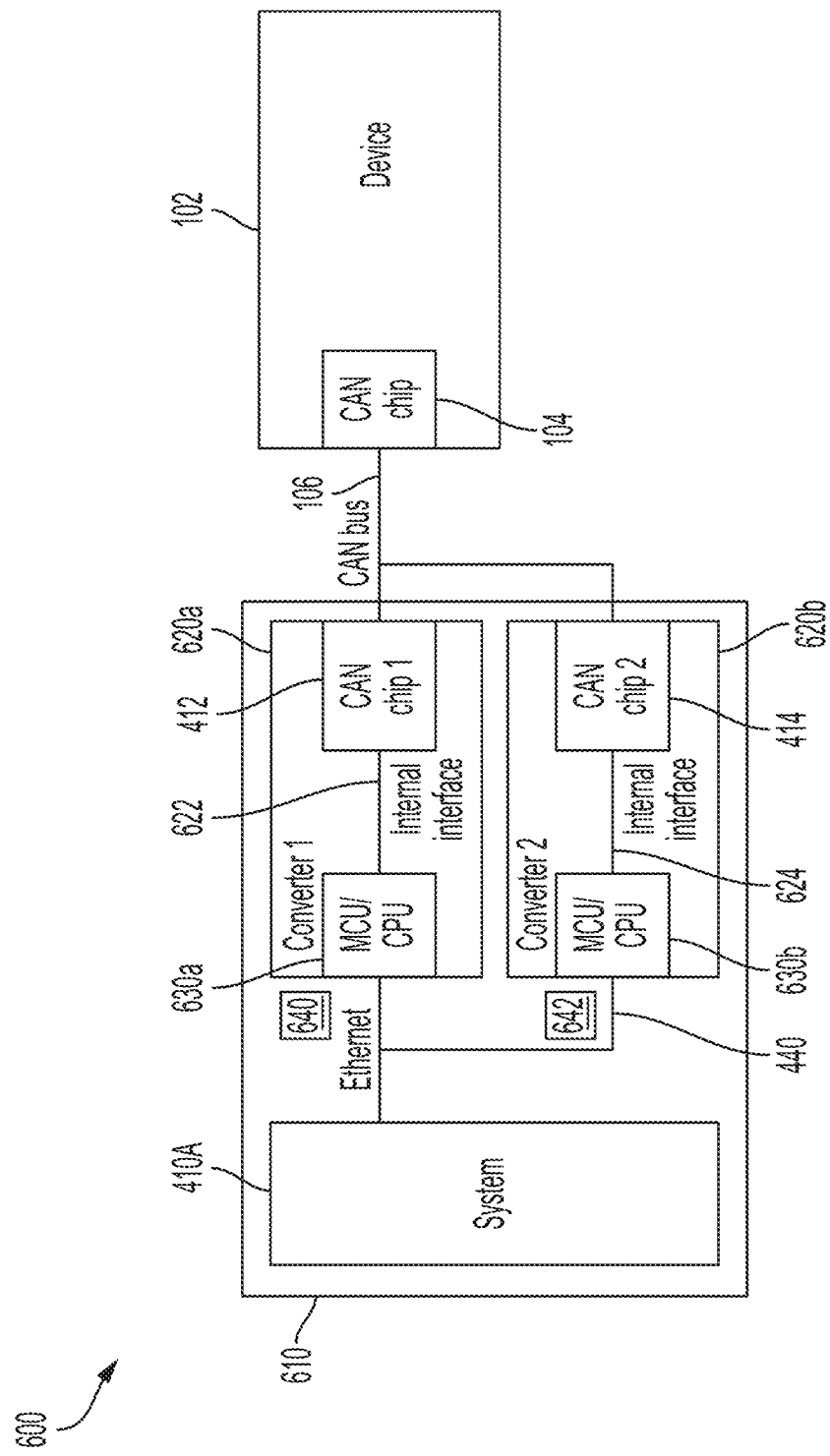
FIG. 6 is a diagram of a system, in accordance with one or more embodiments.

FIG. 6 is a diagram of a system 600, in accordance with one or more embodiments.

System 600 is an embodiment of system 100 of FIG. 1, and similar detailed description is therefore omitted.

System 600 includes device 102, CAN chip 104, CAN bus 106 and a computer system 610. Computer system 610 is an embodiment of computer system 110 of FIG. 1, and similar detailed description is therefore omitted.

Computer system 610 is a variation of computer system 410 of FIG. 4, and similar detailed description is therefore omitted. In comparison with computer system 410 of FIG. 4, computer system 610 includes converter circuits 620a and 620b rather than converter circuit 420, and similar detailed description is therefore omitted. Stated differently, converter circuits 620a and 620b of computer system 610 replace converter circuit 420 of computer system 410 in FIG. 4, and similar detailed description is therefore omitted.

Computer system 610 includes converter circuits 620a and 620b coupled to system portion 410A by Ethernet link 440. Each of converter circuit 620a and 620b is a variation of converter circuit 420 of FIG. 4, and similar detailed description is therefore omitted. In some embodiments, converter circuit 620a and 620b are coupled to system portion 410A by separate network links.

Converter circuit 620a includes CAN chip 412 and a processor 630a. Processor 630a is similar to processor 430, and similar detailed description is omitted for brevity.

Converter circuit 620b includes CAN chip 414 and a processor 630b. Processor 630b is similar to processor 430, and similar detailed description is omitted for brevity. Converter circuit 620a is different from converter circuit 620b. In some embodiments, converter circuit 620a and converter circuit 620b are manufactured by different entities. In some embodiments, at least converter circuit 620a or 620b includes a different number of processors or CAN chips.

CAN chip 412 is coupled to processor 630a by an interface 622. CAN chip 414 is coupled to processor 630b by an interface 624. At least interface 622 or 624 is an interface internal of corresponding converter circuit 620a or 620b. In some embodiments, interfaces 622 and 624 are similar to corresponding interfaces 622 and 624, and similar detailed description is omitted for brevity.

In some embodiments, system portion 410A is configured to detect a failure of at least CAN chip 412 or CAN chip 414. For example, in some embodiments, CAN chips 412 and 414 are configured to receive the same CAN frames from device 102, and CAN chips 412 and 414 are configured to strip off the corresponding CRCs and forward the corresponding remaining CAN frames 640 and 642 to corresponding processors 630a and 630b.

In these embodiments, processor 630a is configured to forward or pass the remaining CAN frame 640 to system portion 410A, and processor 630a is configured to forward or pass the remaining CAN frame 642 to system portion 410A.

In these embodiments, system portion 410A is configured to detect a failure of at least CAN chip 412 or CAN chip 414 by executing a frame comparison of remaining CAN frames 640 and 642 that is similar to the frame comparison performed by CAN frames comparison portion 116 in FIG. 1, and similar detailed description is omitted for brevity.

By including system 610 in system 600, system 600 operates to achieve the benefits discussed above with respect to system 100.

Other quantities, configurations or order of elements within system 600 are within the scope of the present disclosure. For example, in some embodiments, system 600 includes a number of CAN chips different than three.

Figure 7A:
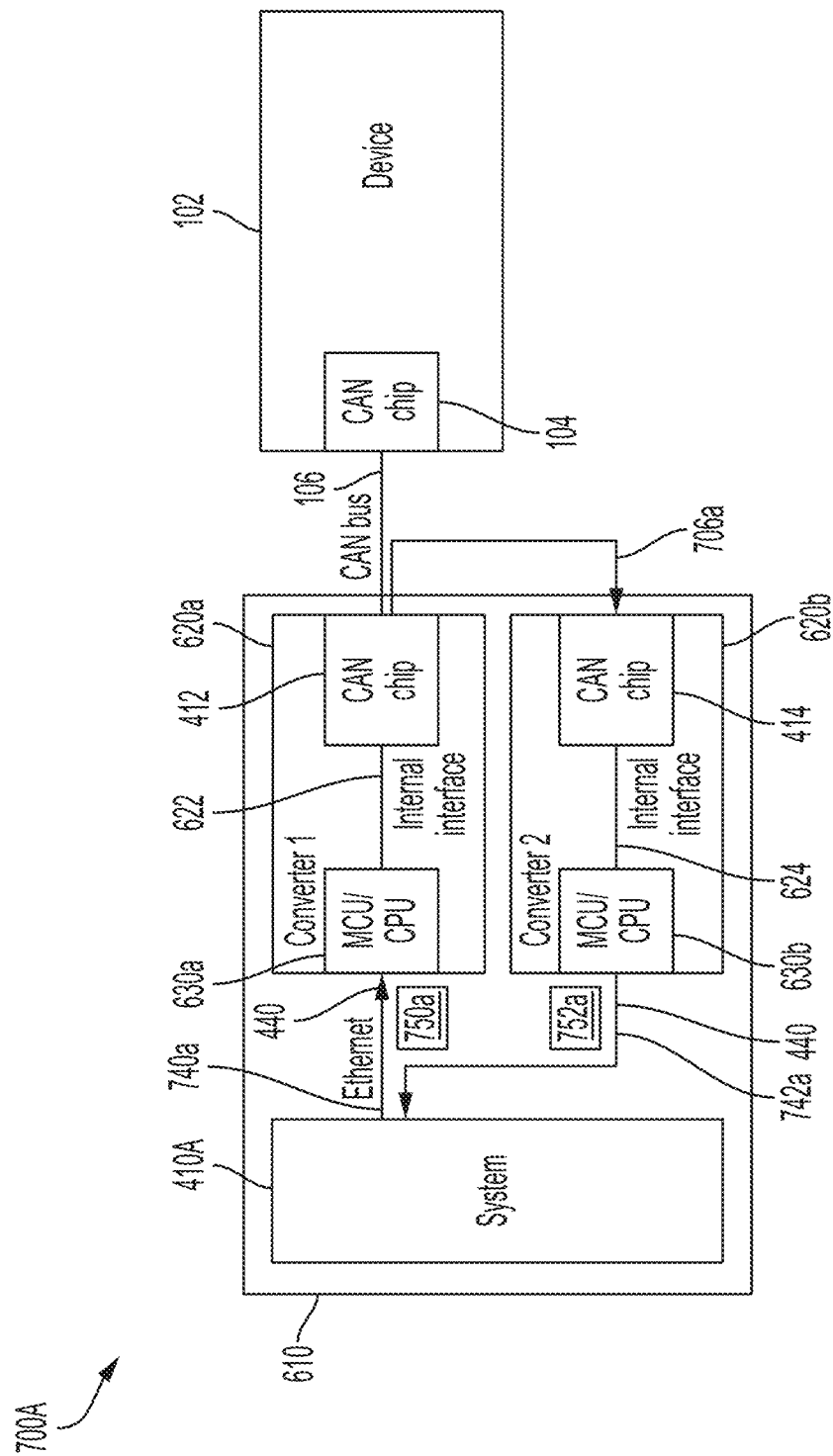
FIG. 7A is a diagram of a system, in accordance with one or more embodiments.

FIG. 7A is a diagram of a system 700A, in accordance with one or more embodiments.

System 700A is an embodiment of system 100 of FIG. 1, and similar detailed description is therefore omitted.

System 700A includes device 102, CAN chip 104, CAN bus 106 and computer system 610.

System 700A is a variation of system 600 of FIG. 6, and similar detailed description is therefore omitted. For example, in some embodiments, system 700A corresponds to a first end-to-end check or test of computer system 610 of system 600. In some embodiments, the first end-to-end check of computer system 610 of system 700A or 700B (FIG. 7B) is similar to method 900 in FIG. 9 (described below).

In some embodiments, the first end-to-end check of computer system 610 of system 700A includes sending a first known data string 750a through computer system 610 by a first path. In some embodiments, the first path is from computer system 610 to CAN chip 412 to CAN chip 414 and back to computer system 610. In some embodiments, the data string includes CAN frames.

In some embodiments, the first end-to-end check of computer system 610 of system 700A includes computer system 610 being configured to send the first known data string 750a to CAN chip 412 by a link 740a, CAN chip 412 being configured to send a CAN frame based on the first known data string 750a to CAN chip 414 by path 706a (e.g., over CAN bus 106), CAN chip 414 being configured to receive the CAN frame from CAN chip 412, and CAN chip 414 being configured to send the remaining CAN frame, that includes another first data string 752a, to computer system 610 by a link 742a. In these embodiments, computer system 610 compares the first known data string 750a and the another first data string 752a to determine if there is a match. In some embodiments, computer system 610 detects that a failure of at least CAN chip 412 or CAN chip 414 occurred, if the first known data string 750a is not identical to the another first data string 752a. In some embodiments, computer system 610 detects that a failure of at least CAN chip 412 or CAN chip 414 did not occur, if the first known data string 750a is identical to the first another data string 752a.

In some embodiments, the first end-to-end check of computer system 610 of system 700A is periodically performed and the periodicity between the first end-to-end check or test is based on failure rates of CAN chips 412 and 414, and the failure rates of processors 630a and 630b.

By including system 610 in system 700A, system 700A operates to achieve the benefits discussed above with respect to system 100.

Other quantities, configurations or order of elements within system 700A are within the scope of the present disclosure. For example, in some embodiments, system 700A includes a number of CAN chips different than three.

Figure 7B:
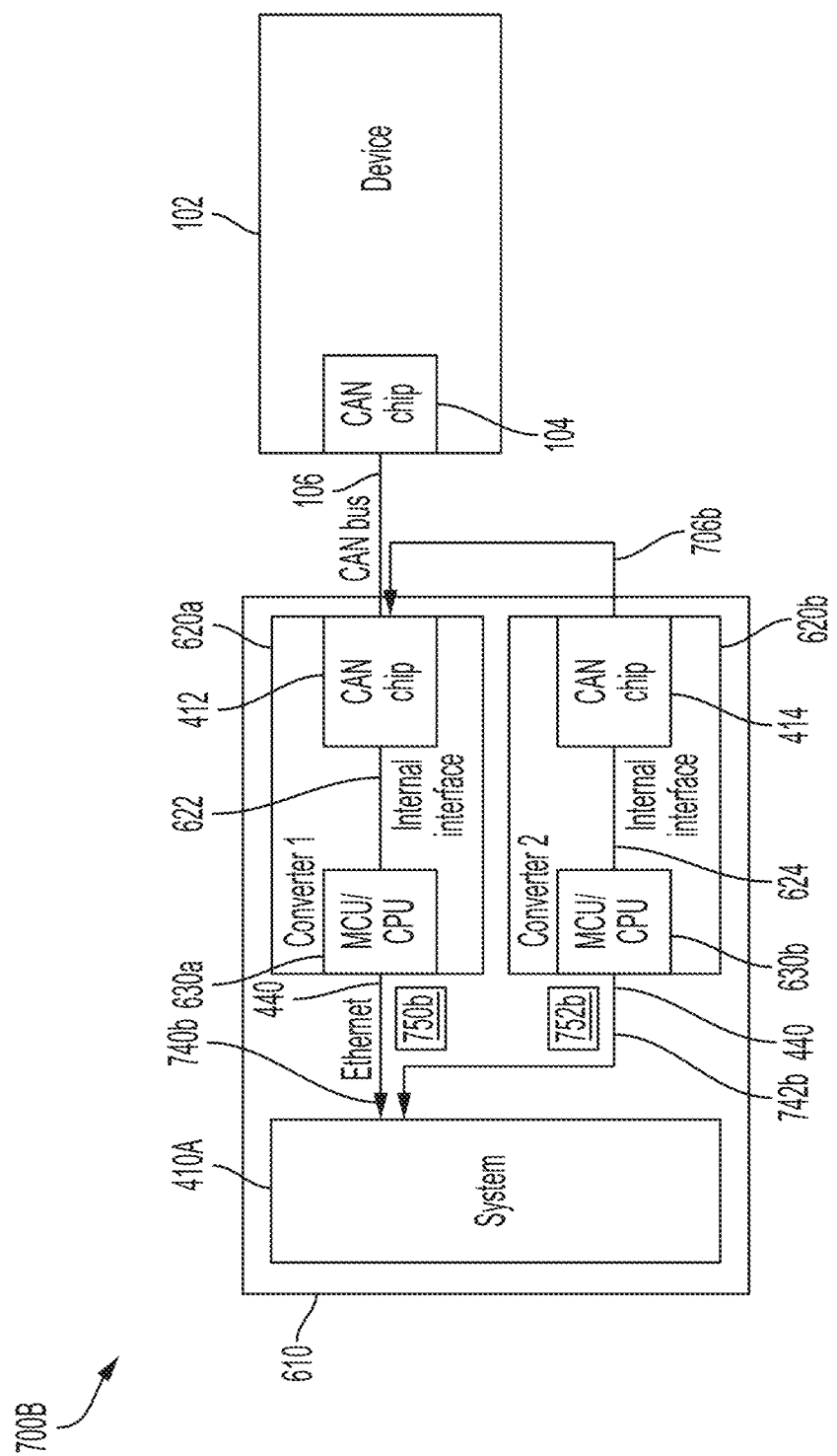
FIG. 7B is a diagram of a system, in accordance with one or more embodiments.

FIG. 7B is a diagram of a system 700B, in accordance with one or more embodiments.

System 700B is an embodiment of system 100 of FIG. 1, and similar detailed description is therefore omitted.

System 700B includes device 102, CAN chip 104, CAN bus 106 and computer system 610.

System 700B is a variation of system 600 of FIG. 6, and similar detailed description is therefore omitted. For example, in some embodiments, system 700B corresponds to a second end-to-end check or test of computer system 610 of system 600. In some embodiments, the second end-to-end check of computer system 610 of system 700B or 700B (FIG. 7B) is similar to method 900 in FIG. 9 (described below).

In some embodiments, the second end-to-end check of computer system 610 of system 700B includes sending a second known data string 752b through computer system 610 by a second path. In some embodiments, the second path is from computer system 610 to CAN chip 414 to CAN chip 412 and back to computer system 610.

In some embodiments, the second end-to-end check of computer system 610 of system 700B includes computer system 610 being configured to send the second known data string 752b to CAN chip 414 by a link 742b, CAN chip 414 being configured to send a CAN frame based on the second known data string 752b to CAN chip 412 by path 706b (e.g., over CAN bus 106), CAN chip 412 being configured to receive the CAN frame from CAN chip 414, and CAN chip 412 being configured to send the remaining CAN frame, that includes another second data string 750b, to computer system 610 by a link 740b. In these embodiments, computer system 610 compares the second known data string 752b and the another second data string 750b to determine if there is a match. In some embodiments, computer system 610 detects that a failure of at least CAN chip 412 or CAN chip 414 occurred, if the second known data string 752b is not identical to the another second data string 750b. In some embodiments, computer system 610 detects that a failure of at least CAN chip 412 or CAN chip 414 did not occur, if the second known data string 752b is identical to the second another data string 750b.

In some embodiments, the second end-to-end check of computer system 610 of system 700B is periodically performed and the periodicity between the second end-to-end check or test is based on failure rates of CAN chips 412 and 414, and the failure rates of processors 630a and 630b.

In some embodiments, system 700A or 700B is configured to periodically perform a test of device 102, by having computer system 610 being configured to send a third known data string to device 102 by at least CAN chip 412 or 414, and having device 102 being configured to send back a fourth data string (similar to the third known data string) to computer system 610. In some embodiments, computer system 610 detects that a failure of CAN chip 104 occurred, if the third known data string is not identical to the fourth data string. In some embodiments, computer system 610 detects that a failure of CAN chip 104 did not occur, if the third known data string is identical to the fourth data string. In some embodiments, the third known data string or the fourth data string includes a software (S/W) version number, an interface version and/or an identifier identification (ID), and each of which is known by system 700A or 700B.

By including system 610 in system 700B, system 700B operates to achieve the benefits discussed above with respect to system 100.

Other quantities, configurations or order of elements within system 700B are within the scope of the present disclosure. For example, in some embodiments, system 700B includes a number of CAN chips different than three.

Figure 8:
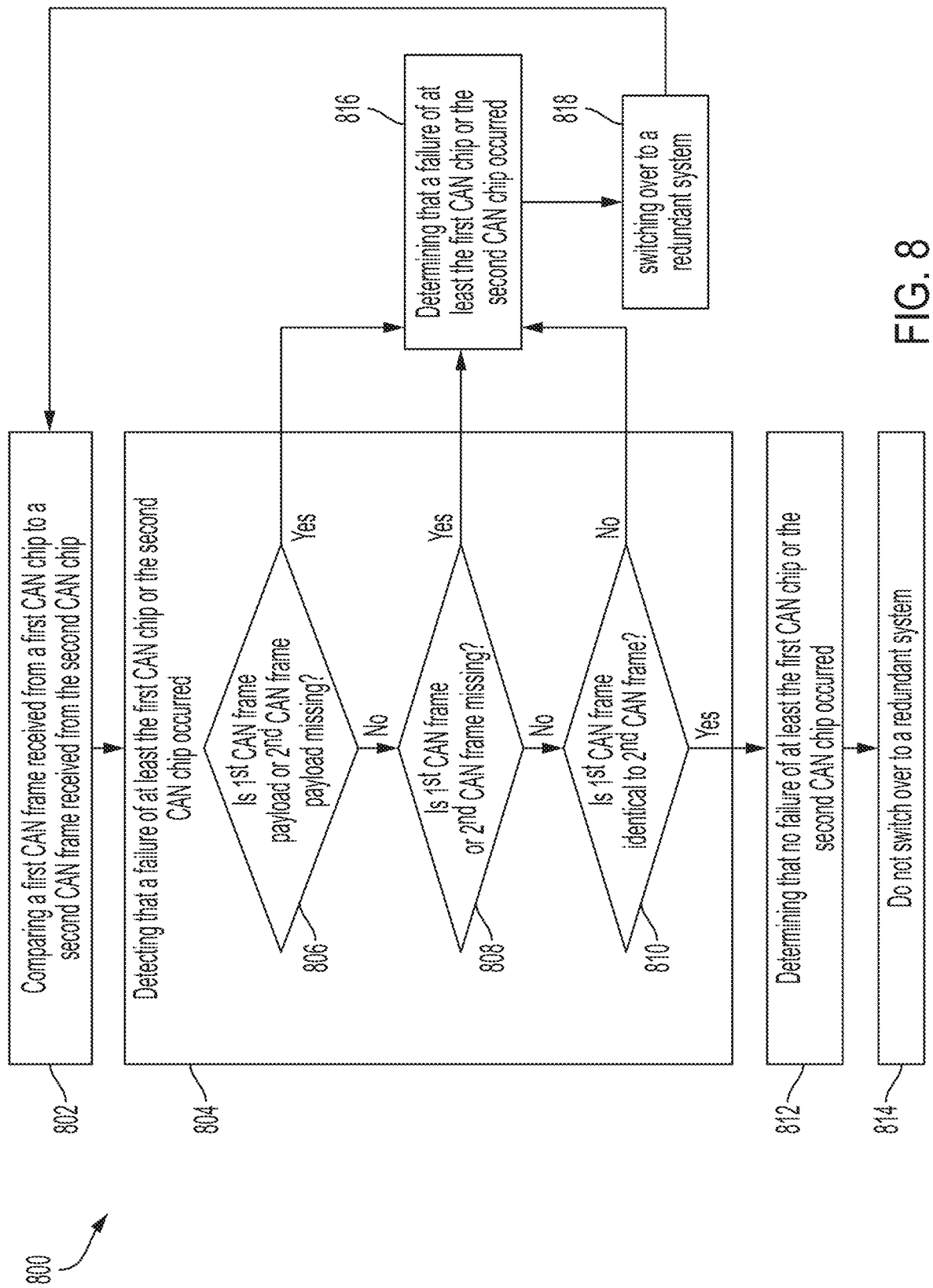
FIG. 8 is a flowchart of a method of testing a system, in accordance with one or more embodiments.

FIG. 8 is a flowchart of a method 800 of testing a system, in accordance with some embodiments.

In some embodiments, FIG. 8 is a flowchart of a method of CAN bus traffic supervision of the system, such as system 100, 200, 300, 400, 500, 600, 700A or 700B, or system 1000 (FIG. 10). In some embodiments, FIG. 8 is a flowchart of a method of testing system 100, 200, 300, 400, 500, 600, 700A or 700B, or system 1000 (FIG. 10).

It is understood that additional operations may be performed before, during, and/or after the method 800 depicted in FIG. 8, and that some other operations may only be briefly described herein. In some embodiments, other order of operations of method 800 is within the scope of the present disclosure. Method 800 includes exemplary operations, but the operations are not necessarily performed in the order shown. Operations may be added, replaced, changed order, and/or eliminated as appropriate, in accordance with the spirit and scope of disclosed embodiments. It is understood that method 800 utilizes features of one or more of system 100, 200, 300, 400, 500, 600, 700A or 700B, or system 1000 (FIG. 10). In some embodiments, one or more of operations 802-818 are not performed.

In operation 802 of method 800, a first CAN frame received from a first CAN chip is compared to a second CAN frame received from the second CAN chip within a CAN comparison period. In some embodiments, the first CAN chip of method 800 includes CAN chip 112 or 412. In some embodiments, the second CAN chip of method 800 includes CAN chip 114 or 414.

In some embodiments, operation 802 is performed by system portion 410A. In some embodiments, operation 802 is performed by at least system 100-700B or 1000. In some embodiments, operation 802 is performed by at least processor 430, 530, 630a, 630b or 1002. In some embodiments, operation 802 is performed by at least CAN frames comparison portion 116, 216 or 316.

In operation 804 of method 800, a failure of at least the first CAN chip or the second CAN chip is detected. In some embodiments, operation 804 is performed by system portion 410A. In some embodiments, operation 804 is performed by at least system 100-700B or 1000. In some embodiments, operation 804 is performed by at least CAN frames comparison portion 116, 216 or 316.

In some embodiments, operation 804 of method 800 includes one or more of operations 806, 808 and 810. In some embodiments, failing one or more of the tests of operations 806, 808 and 810 results in determining that at least the first CAN chip or the second CAN chip have failed, and the method proceeds to operation 816.

In operation 806 of method 800, a determination is made if at least the first CAN frame or the second CAN frame payload is missing within the comparison period.

In some embodiments, operation 806 is performed by system portion 410A. In some embodiments, operation 806 is performed by at least system 100-700B or 1000. In some embodiments, operation 806 is performed by at least CAN frames comparison portion 116, 216 or 316. In some embodiments, operation 806 is performed by at least processor 430, 530, 630a, 630b or 1002. In some embodiments, operation 806 is performed by at least CAN frames comparison portion 116, 216 or 316.

In some embodiments, if at least the first CAN frame payload or the second CAN frame payload is missing within the comparison period, then the first CAN chip and the second CAN chip have failed, and the result of operation 806 is a "yes", and method 800 proceeds to operation 816.

In some embodiments, if at least the first CAN frame payload or the second CAN frame payload is not missing within the comparison period, then the first CAN chip and the second CAN chip have not failed this operation, and the result of operation 806 is a "no", and method 800 proceeds to operation 808.

In operation 808 of method 800, a determination is made if at least the first CAN frame or the second CAN frame is missing within the comparison period.

In some embodiments, operation 808 is performed by system portion 410A. In some embodiments, operation 808 is performed by at least system 100-700B or 1000. In some embodiments, operation 808 is performed by at least CAN frames comparison portion 116, 216 or 316. In some embodiments, operation 808 is performed by at least processor 430, 530, 630a, 630b or 1002. In some embodiments, operation 808 is performed by at least CAN frames comparison portion 116, 216 or 316.

In some embodiments, if at least the first CAN frame or the second CAN frame is missing within the comparison period, then the first CAN chip and the second CAN chip have failed, and the result of operation 808 is a "yes", and method 800 proceeds to operation 816.

In some embodiments, if at least the first CAN frame or the second CAN frame is not missing within the comparison period, then the first CAN chip and the second CAN chip have not failed this operation, and the result of operation 808 is a "no", and method 800 proceeds to operation 810.

In operation 810 of method 800, a determination is made if the first CAN frame is identical to the second CAN frame within the CAN comparison period.

In some embodiments, operation 810 is performed by system portion 410A. In some embodiments, operation 810 is performed by at least system 100-700B or 1000. In some embodiments, operation 810 is performed by at least CAN frames comparison portion 116, 216 or 316. In some embodiments, operation 810 is performed by at least processor 430, 530, 630a, 630b or 1002. In some embodiments, operation 810 is performed by at least CAN frames comparison portion 116, 216 or 316.

In some embodiments, if the first CAN frame is identical to the second CAN frame, then the first CAN chip and the second CAN chip have not failed, and the result of operation 806 is a "yes", and method 800 proceeds to operation 812.

In some embodiments, if the first CAN frame is not identical to the second CAN frame, then at least the first CAN chip or the second CAN chip has failed, and the result of operation 806 is a "no", and method 800 proceeds to operation 816.

In operation 812 of method 800, a determination is made that no failure of at least the first CAN chip or the second CAN chip occurred. In some embodiments, determining that no failure of at least the first CAN chip or the second CAN chip occurred of operation 812 is made in response to determining that the first CAN frame is identical to the second CAN frame.

In some embodiments, operation 812 is performed by system portion 410A. In some embodiments, operation 812 is performed by at least system 100-700B or 1000. In some embodiments, operation 812 is performed by at least CAN frames comparison portion 116, 216 or 316. In some embodiments, operation 812 is performed by at least processor 430, 530, 630a, 630b or 1002. In some embodiments, operation 812 is performed by at least CAN frames comparison portion 116, 216 or 316.

In operation 814 of method 800, the system does not switch over to a redundant system in response to detecting that no failure of at least the first CAN chip or the second CAN chip occurred. In some embodiments, the redundant system of method 800 includes at least system 200 or 300.

In some embodiments, operation 814 is performed by system portion 410A. In some embodiments, operation 814 is performed by at least system 100-700B or 1000.

In operation 816 of method 800, a determination is made that a failure of at least the first CAN chip or the second CAN chip occurred.

In some embodiments, determining that the failure of at least the first CAN chip or the second CAN chip occurred of operation 816 is made in response to determining that at least the first CAN frame payload or the second CAN frame payload is missing or unavailable.

In some embodiments, determining that the failure of at least the first CAN chip or the second CAN chip occurred of operation 816 is made in response to determining that at least the first CAN frame or the second CAN is missing or unavailable.

In some embodiments, determining that the failure of at least the first CAN chip or the second CAN chip occurred of operation 816 is made in response to determining that the first CAN frame is not identical to the second CAN frame.

In some embodiments, operation 816 is performed by system portion 410A. In some embodiments, operation 816 is performed by at least system 100-700B or 1000. In some embodiments, operation 816 is performed by at least CAN frames comparison portion 116, 216 or 316. In some embodiments, operation 816 is performed by at least processor 430, 530, 630a, 630b or 1002. In some embodiments, operation 816 is performed by at least CAN frames comparison portion 116, 216 or 316.

In operation 818 of method 800, the system switches over to a redundant system in response to detecting that the failure of at least the first CAN chip or the second CAN chip occurred.

In some embodiments, operation 818 is performed by system portion 410A. In some embodiments, operation 818 is performed by at least system 100-700B or 1000.

In some embodiments, after operation 818, method 800 returns to operation 802 to perform additional testing operations.

In some embodiments, the additional testing operations are performed in operations 802, 804, 806, 808 and 810 to determine if the redundant system still fails method 800.

By operating method 800, the testing of system 800 operates to achieve the benefits discussed above with respect to system 100-700B.

Figure 9:
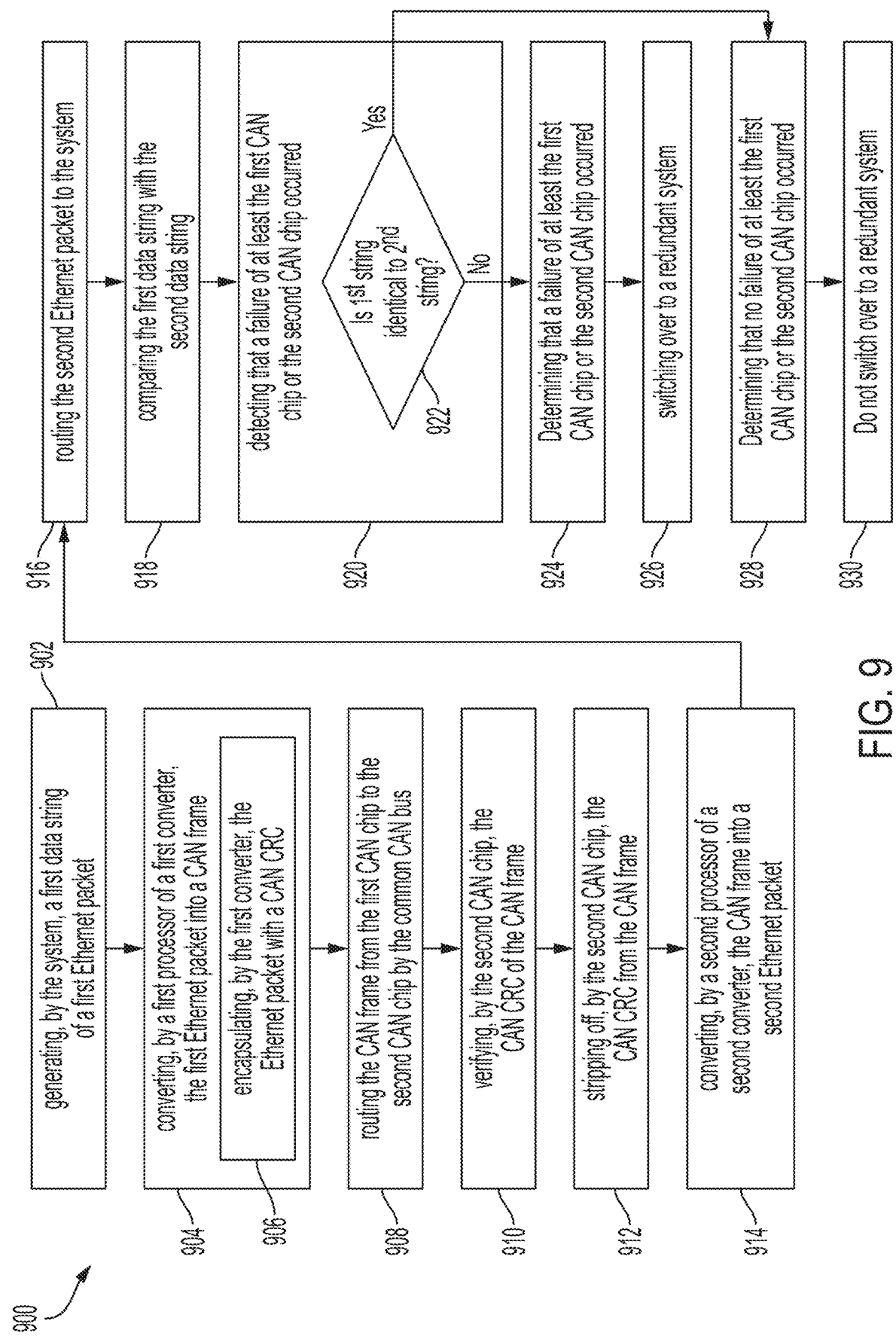
FIG. 9 is a flowchart of a method of testing a system, in accordance with one or more embodiments.

FIG. 9 is a flowchart of a method 900 of testing a system, in accordance with some embodiments.

In some embodiments, method 900 is the first end-to-end check or test of computer system 610 of system 700A. In some embodiments, method 900 is the second end-to-end check or test of computer system 610 of system 700B.

In some embodiments, method 900 is a method of monitoring a system, such as system 100, 200, 300, 400, 500, 600, 700A or 700B, or system 1000 (FIG. 10). In some embodiments, FIG. 9 is a flowchart of a method of testing system 100, 200, 300, 400, 500, 600, 700A or 700B, or system 1000 (FIG. 10).

It is understood that additional operations may be performed before, during, and/or after the method 900 depicted in FIG. 9, and that some other operations may only be briefly described herein. In some embodiments, other order of operations of method 900 is within the scope of the present disclosure. Method 900 includes exemplary operations, but the operations are not necessarily performed in the order shown. Operations may be added, replaced, changed order, and/or eliminated as appropriate, in accordance with the spirit and scope of disclosed embodiments. It is understood that method 900 utilizes features of one or more of system 100, 200, 300, 400, 500, 600, 700A or 700B, or system 1000 (FIG. 10). In some embodiments, one or more of operations 902-930 are not performed.

In operation 902 of method 900, a first data string of a first Ethernet packet is generated by the system. In some embodiments, the first data string of method 900 includes first known data string 750*a*. In some embodiments, system of method 900 includes system portion 410A. In some embodiments, system of method 900 includes at least system 100-700B or 1000.

In operation 904 of method 900, the first Ethernet packet is converted into a CAN frame.

In some embodiments, operation 904 is performed by a first CAN chip. In some embodiments, operation 904 is performed by a first processor of a first converter. In some embodiments, the first converter includes the first CAN chip.

In some embodiments, the first processor of method 900 includes processor 630*a*. In some embodiments, the first processor of method 900 includes at least processor 430 or 530. In some embodiments, the first converter of method 900 includes converter circuit 620*a*. In some embodiments, the first converter of method 900 includes at least converter circuit 420 or 520.

In some embodiments, the first CAN chip of method 900 includes CAN chip 412. In some embodiments, the first CAN chip of method 900 includes CAN chip 112.

In some embodiments, operation 904 includes operation 906.

In operation 906 of method 900, the Ethernet packet is encapsulated with a CRC by the first converter thereby converting the Ethernet packet into the CAN frame. In some embodiments, operation 906 is performed by the first CAN chip.

In operation 908 of method 900, the CAN frame is routed from the first CAN chip to the second CAN chip by a common CAN bus. In some embodiments, the CAN frame of operation 908 is routed from the first CAN chip to the second CAN chip by path 706*a*. In some embodiments, the second CAN chip of method 900 includes CAN chip 414. In some embodiments, the second CAN chip of method 900 includes CAN chip 114. In some embodiments, the common CAN bus of method 900 includes CAN bus 106.

In operation 910 of method 900, the CAN CRC of the CAN frame is verified by the second CAN chip. In some embodiments, operation 910 includes the second CAN chip being configured to perform the CAN CRC of the CAN frame.

In operation 912 of method 900, the CAN CRC is stripped off or removed from the CAN frame by the second CAN chip.

In operation 914 of method 900, the CAN frame is converted into a second Ethernet packet by a second processor of a second converter. In some embodiments, the second Ethernet packet includes a second data string. In some embodiments, the second converter includes the second CAN chip.

In some embodiments, the second processor of method 900 includes processor 630*b*. In some embodiments, the second processor of method 900 includes at least processor 430 or 530. In some embodiments, the second converter of method 900 includes converter circuit 620*b*. In some embodiments, the second converter of method 900 includes at least converter circuit 420 or 520.

In some embodiments, the second data string of method 900 includes another first data string 752*a*.

In operation 916 of method 900, the second Ethernet packet is routed to the system by the second processor.

In operation 918 of method 900, the first data string is compared with the second data string by the system.

In operation 920 of method 900, the system detects that a failure of at least the first CAN chip or the second CAN chip occurred. In some embodiments, operation 920 of method 900 includes operation 922.

In operation 922 of method 900, a determination is made by the system if the first data string is identical to the second data string.

In some embodiments, if the first data string is identical to the second data string, then the first CAN chip and the second CAN chip have not failed, and the result of operation 922 is a "yes", and method 900 proceeds to operation 928.

In some embodiments, if the first data string is not identical to the second data string, then at least the first CAN chip or the second CAN chip has failed, and the result of operation 922 is a "no", and method 900 proceeds to operation 924.

In operation 924 of method 900, a determination is made by the system that a failure of at least the first CAN chip or the second CAN chip occurred.

In some embodiments, determining that the failure of at least the first CAN chip or the second CAN chip occurred of operation 924 is made in response to determining that the first data string is not identical to the second data string.

In operation 926 of method 900, the system switches over to a redundant system in response to detecting that the failure of at least the first CAN chip or the second CAN chip occurred.

In some embodiments, after operation 926, method 900 returns to operation 902 to perform additional testing operations. In some embodiments, the additional testing operations are performed in operations 902-930 to determine if the redundant system still fails method 900.

In operation 928 of method 900, a determination is made by the system that no failure of at least the first CAN chip or the second CAN chip occurred. In some embodiments, determining that no failure of at least the first CAN chip or the second CAN chip occurred of operation 928 is made in response to determining that the first string is identical to the second string.

In operation 930 of method 900, the system does not switch over to a redundant system in response to detecting that no failure of at least the first CAN chip or the second CAN chip occurred.

While method 900 was described above with reference to system 700A of FIG. 7A, it is understood that method 900 utilizes the features of system 700B of FIG. 7B and the second path. For example, in these embodiments, method 900 is performed with reference to system 700B, and the first data string of method 900 includes second known data string 752*b*, the second data string of method 900 includes the another data string 750*b*, the first processor of method 900 includes processor 630*b*, the second processor of method 900 includes processor 630*a*, the first CAN chip of method 900 includes CAN chip 414, the second CAN chip of method 900 includes CAN chip 412, the first converter of method 900 includes converter circuit 620*b*, and the second converter of method 900 includes converter circuit 620*a*.

By operating method 900, the testing of system 900 operates to achieve the benefits discussed above with respect to system 100-700B.

FIG. 10 is a block diagram of a system 1000, in accordance with one or more embodiments.

In some embodiments, system 1000 is usable in place of one or more of system 100, 200, 300, 301, 400, 500, 600, 700A or 700B. In some embodiments, system 1000 is usable in place of one or more of computer system 110, 210, 310, 410, 510 or 610. In some embodiments, system 1000 is usable in place of system portion 410A.

System 1000 includes a specific-purpose hardware processor 1002 and a non-transitory, computer readable storage medium 1004 encoded with, i.e., storing, the computer program code 1006, i.e., a set of executable instructions. Computer readable storage medium 1004 is also encoded with instructions 1007 for interfacing with at least CAN chip 112, 114, 212, 214, 312, 314, 412 or 414 or at least converter circuit 420, 520, 620a or 620b. The processor 1002 is electrically coupled to the computer readable storage medium 1004 via a bus 1008. The processor 1002 is also electrically coupled to an I/O interface 1010 by bus 1008. A network interface 1012 is also electrically connected to the processor 1002 via bus 1008. Network interface 1012 is connected to a network 1014, so that processor 1002 and computer readable storage medium 1004 are capable of connecting to external elements via network 1014. The processor 1002 is configured to execute the computer program code 1006 encoded in the computer readable storage medium 1004 in order to cause system 1000 to be usable for performing a portion or all of the operations as described in at least method 800 or 900. In some embodiments, network interface 1012 is an embodiment of the Ethernet interface of Ethernet link 440, and network 1014 is an embodiment of Ethernet link 440.

In some embodiments, the processor 1002 is a central processing unit (CPU), a multi-processor, a distributed processing system, an application specific integrated circuit (ASIC), and/or a suitable processing unit.

In some embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1004 includes a compact disk-read only memory (CD-ROM), a compact disk-read/write (CD-R/W), and/or a digital video disc (DVD).

In some embodiments, the storage medium 1004 stores the computer program code 1006 configured to cause system 1000 to perform at least method 800 or 900. In some embodiments, the storage medium 1004 also stores information needed for performing method 900 as well as information generated during performing at least method 800 or 900 such as CAN frames parameter 1020, a CAN frames payload parameter 1022, a CAN frames comparison period parameter 1024, a CAN frame CRC parameter 1026 and a data strings parameter 1026, and/or a set of executable instructions to perform the operation of at least method 800 or 900.

In some embodiments, the storage medium 1004 stores instructions 1007 to effectively implement at least method 800 or 900.

System 1000 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1002.

System 1000 also includes network interface 1012 coupled to the processor 1002. Network interface 1012 allows system 1000 to communicate with network 1014, to which one or more other computer systems are connected. Network interface 1012 includes wireless network interfaces such as BLUETOOTH, WIFI, WIMAX, GPRS, or WCDMA; or wired network interface such as ETHERNET, USB, or IEEE-1394. In some embodiments, method 900 is implemented in two or more Systems 1000, and information such as memory type, memory array layout, I/O voltage, I/O pin location and charge pump are exchanged between different Systems 1000 via network 1014.

System 1000 is configured to receive CAN frames. The information is stored in computer readable medium 1004 as CAN frames parameter 1020. System 1000 is configured to receive information related to the CAN frames payload through I/O interface 1010 or network interface 1012. The information is stored in computer readable medium 1004 as CAN frames payload parameter 1022. System 1000 is configured to receive information related to the CAN frames comparison period through I/O interface 1010 or network interface 1012. The information is stored in computer readable medium 1004 as CAN frames comparison period parameter 1024. System 1000 is configured to receive information related to the CAN frame CRC through I/O interface 1010 or network interface 1012. The information is stored in computer readable medium 1004 as CAN frame CRC parameter 1026. System 1000 is configured to receive information related to the data strings through I/O interface 1010 or network interface 1012. The information is stored in computer readable medium 1004 as data strings parameter 1026.

During operation, processor 1002 executes a set of instructions to detect a failure of at least CAN chip 112 or CAN chip 114 by comparing remaining CAN frames received from each of CAN chip 112 and CAN chip 114 during the CAN comparison period. In some embodiments, processor 1002 is an embodiment of each of processor 430, 530, 630a and 630b, and similar detailed description is therefore omitted.

An aspect of this description relates to a system. In some embodiments, the system includes a first CAN system a first common CAN bus coupled to the first CAN system. In some embodiments, the first CAN system includes a first CAN chip, a second CAN chip different from the first CAN chip. In some embodiments, the first common CAN bus couples the first CAN chip and the second CAN chip together. In some embodiments, the first CAN chip and the second CAN chip are configured to receive a first CAN frame from the first common CAN bus, and the first CAN system is configured to detect a failure of at least the first CAN chip or the second CAN chip.

Another aspect of this description relates a method of common CAN bus traffic supervision on a system having a common CAN bus, a first CAN chip and a second CAN chip, the first CAN chip and the second CAN chip are coupled together with the common CAN bus. In some embodiments, the method includes comparing a first CAN frame received from the first CAN chip to a second CAN frame received from the second CAN chip within a CAN comparison period, and detecting a failure of at least the first CAN chip or the second CAN chip. Detecting the failure of at least the first CAN chip or the second CAN chip includes determining that the first CAN frame is not identical to the second CAN frame within the CAN comparison period.

Yet another aspect of this description relates to a method of monitoring a system having a common CAN bus, a first CAN chip and a second CAN chip, the first CAN chip and the second CAN chip are coupled together with the common CAN bus. In some embodiments, the method comprises generating, by the system, a first data string of a first Ethernet packet; converting, by a first processor of a first converter, the first Ethernet packet into a CAN frame, the first converter including the first CAN chip; routing the CAN frame from the first CAN chip to the second CAN chip by the common CAN bus; converting, by a second processor of a second converter, the CAN frame into a second Ethernet packet, the second Ethernet packet including a second data string, the second converter including the second CAN chip; routing the second Ethernet packet to the system; comparing the first data string with the second data string; and detecting that a failure of at least the first CAN chip or the second CAN chip occurred. In some embodiments, detecting that the failure of at least the first CAN chip or the second CAN chip occurred comprises determining that the first data string is not identical to the second data string.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system comprising:
   a first controller area network (CAN) system including:
      a first CAN chip; and
      a second CAN chip different from the first CAN chip; and
   a first common CAN bus coupled to the first CAN system, the first common CAN bus coupling the first CAN chip and the second CAN chip together;
   wherein the first CAN chip and the second CAN chip are configured to receive a first CAN frame from the first common CAN bus, and the first CAN system is configured to detect a failure of at least the first CAN chip or the second CAN chip, wherein the first CAN system configured to detect the failure of at least the first CAN chip or the second CAN chip comprises:
      the first CAN system being configured to determine that the first CAN frame is not identical to the second CAN frame.

2. The system of claim 1, further comprising:
   a second CAN system including:
      a third CAN chip; and
      a fourth CAN chip different from the third CAN chip;
   a second common CAN bus coupled to the second CAN system, the second common CAN bus coupling the first CAN chip and the second CAN chip together;
   wherein the third CAN chip and the fourth CAN chip are configured to receive a second CAN frame from the second common CAN bus, and the second CAN system is configured to detect a failure of at least the third CAN chip or the fourth CAN chip.

3. The system of claim 1, further comprising:
   a second CAN system coupled to the first common CAN bus, the second CAN system including:
      a third CAN chip; and
      a fourth CAN chip different from the third CAN chip;
   wherein the first common CAN bus further couples the third CAN chip and the fourth CAN chip together, the third CAN chip and the fourth CAN chip are configured to receive the first CAN frame from the first common CAN bus, and the second CAN system is configured to detect a failure of at least the third CAN chip or the fourth CAN chip.

4. The system of claim 1, wherein the first CAN system further comprises:
   a first region including an Ethernet interface; and
   a first converter circuit coupled to the Ethernet interface by an Ethernet link, and configured to convert Ethernet packets into CAN frames, and the CAN frames into the Ethernet packets, the first converter circuit comprising:
      a first processor coupled to the Ethernet interface by the Ethernet link;
      the first CAN chip coupled to the first processor by a first interface; and
      the second CAN chip coupled to the first processor by a second interface.

5. The system of claim 1, wherein the first CAN system further comprises:
   a first region including an Ethernet interface; and
   a first converter circuit coupled to the Ethernet interface by an Ethernet link, and configured to convert Ethernet packets into CAN frames, and the CAN frames into the Ethernet packets, the first converter circuit comprising:
      a first processor coupled to the Ethernet interface by the Ethernet link; and
      the first CAN chip coupled to the first processor by a first interface; and
   a second converter circuit coupled to the Ethernet interface by the Ethernet link, and configured to convert the Ethernet packets into the CAN frames, and the CAN frames into the Ethernet packets, the second converter circuit comprising:
      a second processor coupled to the Ethernet interface by the Ethernet link; and
      the second CAN chip coupled to the second processor by a second interface.

6. The system of claim 2, further comprising:
   a first device coupled to the first CAN system by the first common CAN bus, the first device comprising:
      a fifth CAN chip coupled to the first CAN chip and the second CAN chip by the first common CAN bus; and
   a second device coupled to the second CAN system by the second common CAN bus, the second device comprising:
      a sixth CAN chip coupled to the third CAN chip and the fourth CAN chip by the second common CAN bus.

7. The system of claim 3, further comprising:
   a first device coupled to the first CAN system and the second CAN system by the first common CAN bus, the first device comprising:
      a third CAN chip coupled to the first CAN chip, the second CAN chip, the third CAN chip and the fourth CAN chip by the first common CAN bus.

8. The system of claim 4, wherein
the first CAN chip is configured to strip a first CAN frame data payload from the first CAN frame, and is configured to send the first CAN frame data payload to the first processor by the first interface;

the first processor is configured to pass the first CAN frame data payload received from the first CAN chip to the first CAN system by the Ethernet link;

the second CAN chip is configured to strip a second CAN frame data payload from the first CAN frame, and is configured to send the second CAN frame data payload to the first processor by the second interface;

the first processor is configured to determine a first cyclic redundancy check (CRC) on the second CAN frame data payload, and is configured to pass the first CRC to the first CAN system by the Ethernet link; and the first CAN system is configured to receive the first CAN frame data payload and the CRC, is configured to determine a second CRC based on the first CAN frame data payload, and is configured to compare the first CRC and the second CRC to each other.

9. The system of claim 8, wherein the first CAN system is configured to determine that a failure of at least the first CAN chip or the second CAN chip occurred in response to determining that the first CRC is not identical to the second CRC; or the first CAN system is configured to determine that the failure of at least the first CAN chip or the second CAN chip did not occur in response to determining that the first CRC is identical to the second CRC.

10. A method of common controller area network (CAN) bus traffic supervision on a system having a common CAN bus, a first CAN chip and a second CAN chip, the first CAN chip and the second CAN chip are coupled together with the common CAN bus, the method comprising:

comparing a first CAN frame received from the first CAN chip to a second CAN frame received from the second CAN chip within a CAN comparison period; and detecting a failure of at least the first CAN chip or the second CAN chip, wherein detecting the failure of at least the first CAN chip or the second CAN chip comprises:

determining that the first CAN frame is not identical to the second CAN frame within the CAN comparison period.

11. The method of claim 10, further comprising:

switching over to a redundant system, in response to detecting the failure of at least the first CAN chip or the second CAN chip occurred.

12. The method of claim 10, wherein detecting the failure of at least the first CAN chip or the second CAN chip, further comprises:

determining that first CAN frame payload of the first CAN frame is missing or unavailable within the CAN comparison period.

13. The method of claim 10, wherein detecting the failure of at least the first CAN chip or the second CAN chip, further comprises:

determining that the first CAN frame or the second CAN frame is missing or unavailable within a CAN timeout.

14. The method of claim 10, further comprising:

determining that no failure of at least the first CAN chip or the second CAN chip occurred in response to determining that the first CAN frame is identical to the second CAN frame.

15. The method of claim 10, wherein comparing the first CAN frame received from the first CAN chip to the second CAN frame received from the second CAN chip within the CAN comparison period, comprises:

comparing a first payload of the first CAN frame to a second payload of the second CAN frame within the CAN comparison period; and determining that the first CAN frame is not identical to the second CAN frame, comprises:

determining that the first payload of the first CAN frame is not identical to the second payload of the second CAN frame.

16. The method of claim 12, wherein detecting the failure of at least the first CAN chip or the second CAN chip, further comprises:

determining that second CAN frame payload of the second CAN frame is missing or unavailable within the CAN comparison period.

17. A method of monitoring a system having a common controller area network (CAN) bus, a first CAN chip and a second CAN chip, the first CAN chip and the second CAN chip are coupled together with the common CAN bus, the method comprising:

generating, by the system, a first data string of a first Ethernet packet;

converting, by a first processor of a first converter, the first Ethernet packet into a CAN frame, the first converter including the first CAN chip;

routing the CAN frame from the first CAN chip to the second CAN chip by the common CAN bus;

converting, by a second processor of a second converter, the CAN frame into a second Ethernet packet, the second Ethernet packet including a second data string, the second converter including the second CAN chip;

routing the second Ethernet packet to the system;

comparing the first data string with the second data string; and detecting that a failure of at least the first CAN chip or the second CAN chip occurred, wherein detecting that the failure of at least the first CAN chip or the second CAN chip occurred comprises:

determining that the first data string is not identical to the second data string.

18. The method of claim 17, further comprising:

detecting that no failure of at least the first CAN chip or the second CAN chip occurred, wherein detecting that no failure of at least the first CAN chip or the second CAN chip occurred comprises:

determining that the first data string is identical to the second data string.

19. The method of claim 17, wherein converting the first Ethernet packet into the CAN frame comprises:

encapsulating, by the first converter, the first Ethernet packet with a CAN cyclic redundancy check (CRC).

20. The method of claim 19, further comprising:

verifying, by the second CAN chip, the CAN CRC of the CAN frame; and stripping off, by the second CAN chip, the CAN CRC from the CAN frame.

* * * * *